United States Patent
Davies (10) Patent No.: US 12,429,118 B2
(45) Date of Patent: Sep. 30, 2025

(54) ROTARY ACTUATOR

(71) Applicant: Goodrich Actuation Systems Limited, Wolverhampton (GB)

(72) Inventor: Stephen Harlow Davies, Shrewsbury (GB)

(73) Assignee: GOODRICH ACTUATION SYSTEMS LIMITED, West Midlands (GB)

( * ) Notice: Subject to any disclaimer, the term of this patent is extended or adjusted under 35 U.S.C. 154(b) by 0 days.

(21) Appl. No.: 18/615,247

(22) Filed: Mar. 25, 2024

(65) Prior Publication Data

US 2024/0318707 A1 Sep. 26, 2024

(30) Foreign Application Priority Data

Mar. 23, 2023 (EP) ..................................... 23275045

(51) Int. Cl.
*F16H 25/20* (2006.01)
*B64C 13/50* (2006.01)

(52) U.S. Cl.
CPC ............. *F16H 25/20* (2013.01); *B64C 13/50* (2013.01); *F16H 2025/204* (2013.01); *F16H 2025/2053* (2013.01); *F16H 2025/2059* (2013.01); *F16H 2025/2075* (2013.01)

(58) Field of Classification Search
CPC .......................... F16H 2025/2059; B64C 13/50
See application file for complete search history.

(56) References Cited

U.S. PATENT DOCUMENTS 5,311,788 A * 5/1994 Kasuga ............... F16H 25/2204
403/DIG. 1
9,216,815 B2 12/2015 Rodrigues
(Continued)

FOREIGN PATENT DOCUMENTS

| CN | 110588955 A | 12/2019 |
| JP | H0473450 A | 3/1992 |
| JP | H05332416 A | 12/1993 |

OTHER PUBLICATIONS

Abstract CN110588955 (A); Published: Dec. 20, 2019, 1 page.
(Continued)

*Primary Examiner* — Nicholas McFall
(74) *Attorney, Agent, or Firm* — CANTOR COLBURN LLP (57) ABSTRACT

A rotary actuator includes: a shaft; a first threaded portion and a second threaded portion formed on the shaft and axially spaced from each other. A first nut is mounted for movement along the first threaded portion and a second nut is mounted for movement along the second threaded portion. A plurality of first and second components extend radially outward from the first and second nut. An earth sleeve and an output sleeve extend around the shaft and the first and second nuts. The shaft is configured to be driven to rotate about a longitudinal axis thereof relative to the earth sleeve. The earth sleeve comprises a plurality of axially extending earth guides. The output sleeve comprises a plurality of first guides and a plurality of second guides. Each first component engages with a respective first guide and a respective earth guide for movement there along.

15 Claims, 7 Drawing Sheets

(56) References Cited

U.S. PATENT DOCUMENTS

2015/0300465 A1 10/2015 Becchi et al.
2016/0146318 A1 5/2016 Trybula

OTHER PUBLICATIONS

Abstract of JPH0473450 (A), Published: Mar. 9, 1992, 1 page.
Abstract of JPH05332416 (A); Published: Dec. 14, 1993, 1 page.
European Search Report for Application No. 23275045.5, mailed Sep. 21, 2023, 9 pages.

* cited by examiner

ROTARY ACTUATOR

CROSS REFERENCE TO RELATED APPLICATIONS

This application claims priority to European Patent Application No. 23275045.5 filed Mar. 23, 2023, the entire contents of which is incorporated herein by reference.

TECHNICAL FIELD

The present disclosure relates to rotary actuators such as for example, rotary actuators for use in aircraft controls.

BACKGROUND

The present disclosure relates to rotary actuators including, but not limited to, rotary electromechanical actuators. Such actuators may be used to actuate control surfaces as used on aircraft.

In some applications such as, for example, in the aerospace industry, there is a need to produce rotary actuators which facilitate smaller installation envelopes and which provide fast responses to commands.

SUMMARY

According to a first aspect of this disclosure, there is provided a rotary actuator comprising: a shaft; a first threaded portion and a second threaded portion formed on the shaft and axially spaced from each other; a first nut mounted for movement along the first threaded portion; a second nut mounted for movement along the second threaded portion; a plurality of first components extending radially outward from the first nut; a plurality of second components extending radially outward from the second nut; an earth sleeve extending around the shaft and the first and second nuts; and an output sleeve extending around the shaft and the first and second nuts, wherein the shaft is configured to be driven to rotate about a longitudinal axis thereof relative to the earth sleeve, wherein the earth sleeve comprises a plurality of axially extending earth guides, wherein the output sleeve comprises a plurality of first guides and a plurality of second guides, wherein each first component engages with a respective first guide and a respective earth guide for movement there along, wherein each second component engages with a respective second guide and a respective earth guide for movement there along, wherein the first and second threaded portions are threaded so as to cause the first and second nuts to move along the shaft in opposite directions to each other on rotation of the shaft, wherein the plurality of first guides and the plurality of second guides are configured such that movement of the plurality of first and second components along the respective guides as the shaft rotates drives rotation of the output sleeve.

In any example of the disclosure, the actuator may comprise a driver for driving rotation of the shaft.

In any example of the disclosure, the driver may be an electric motor.

In any example of the disclosure, the first threaded portion may be one of a left handed or right handed thread, and the second threaded portion may be the other of a left handed or right handed thread.

In any example of the disclosure, the plurality of first guides and the plurality of second guides may be angled relative to the longitudinal axis.

In any example of the disclosure, each of the plurality of first guides may be angled equally relative to the longitudinal axis and/or each of the plurality of second guides may be angled equally relative to the longitudinal axis.

In any example of the disclosure, the angle of the plurality of first guides relative to the longitudinal axis may be equal and opposite to the angle of the plurality of second guides relative to the longitudinal axis.

In any example of the disclosure, the plurality of first guides may be axially spaced from the plurality of second guides.

In any example of the disclosure, the rotary actuator may comprise or consist of an equal number of first components, second components, first guides and second guides, wherein, optionally, the equal number is two, three, four or six.

In any example of the disclosure, each first guide and each second guide may comprise a track and each first component and each second component may include a roller engaged with a respective track.

In any example of the disclosure, each earth guide may comprise an earth track or first and second axially spaced earth tracks, and each first component and each second component may include an earth roller engaged with the respective earth track or the respective first and second axially spaced earth tracks.

In any example of the disclosure, the output sleeve may be rotatable relative to the earth sleeve.

In any example of the disclosure, the output sleeve may be radially outward of the earth sleeve, or the output sleeve may be radially inward of the earth sleeve.

In any example of the disclosure, the rotary actuator may be configured such that the axial forces generated by each first component moving along each first guide are approximately equal and opposite to the axial forces generated by each second component moving along each second guide.

According to a further aspect of this disclosure, an aircraft may be provided, the aircraft comprising: a control surface; and a rotary actuator according to any example of the disclosure, wherein the rotary actuator is configured to move the control surface relative to the aircraft.

BRIEF DESCRIPTION OF DRAWINGS

Certain examples of the disclosure will now be described by way of example only and with reference to the accompanying drawings in which.

DETAILED DESCRIPTION

Figure 1:
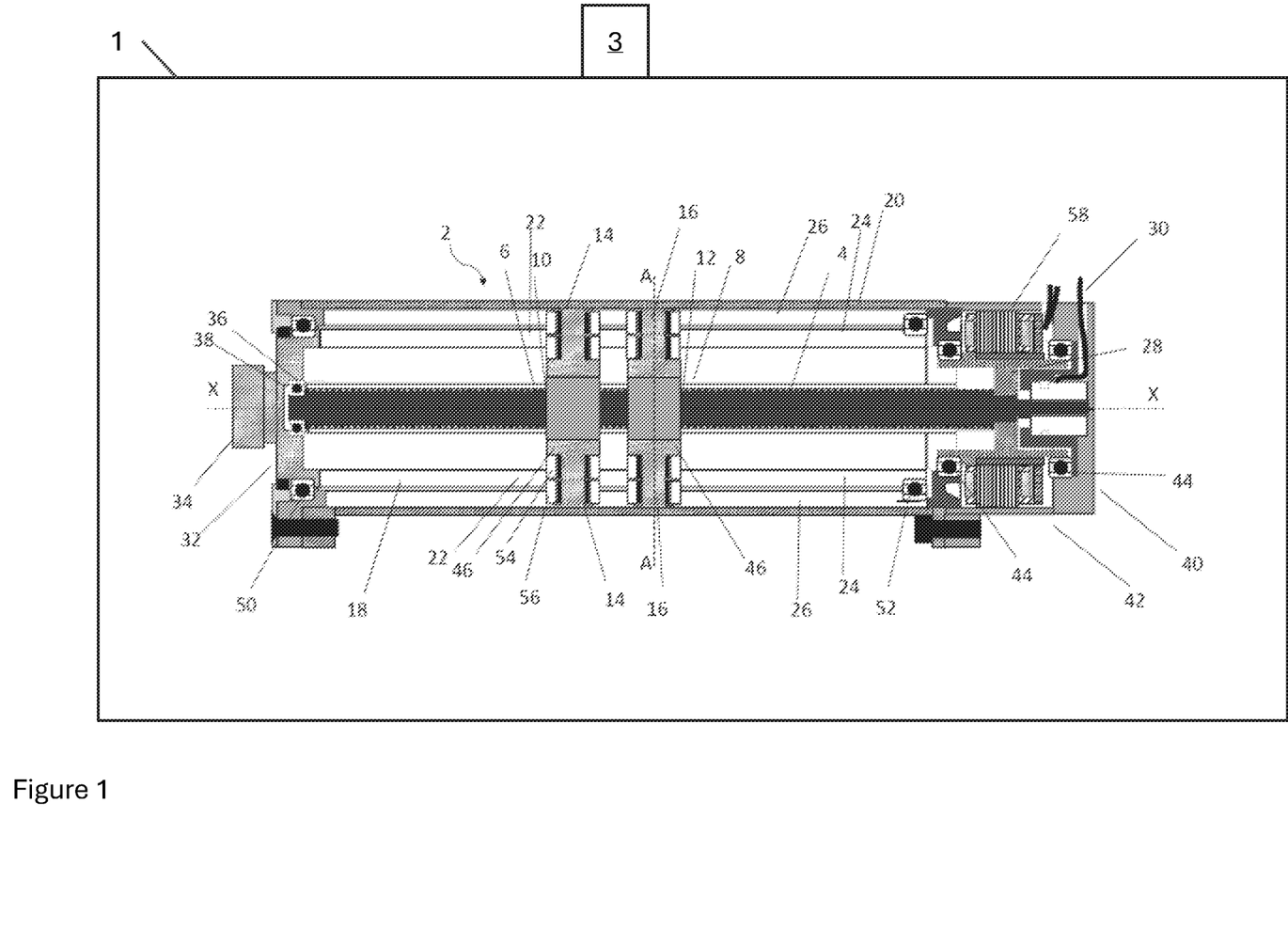
FIG. 1 is a cross sectional view showing an actuator according to an example of the disclosure.

In any example, and referring to the rotary actuator 2 shown in FIG. 1, the disclosure may provide a rotary actuator 2 which has a shaft 4 configured to be driven to rotate about a longitudinal axis X-X thereof. The shaft 4 includes a first threaded portion 6 and a second threaded portion 8 formed on the shaft 4. The first threaded portion 6 is axially spaced from second threaded portion 8. A first nut 10 is provided on the first threaded portion 6. A second nut 12 is provided on the second threaded portion 8. A plurality of first components 14 extend radially outward from the first nut 10. A plurality of second components 16 extend radially outward from the second nut 12. An output sleeve 18 extends around the shaft 4 and the first and second nuts 10, 12. An earth sleeve 20 also extends around the shaft 4 and the first and second nuts 10, 12. It will be understood that in any example of the disclosure, the earth sleeve could be radially inward of the output sleeve 18 such that the output sleeve extends around the earth sleeve. However, in the examples shown in the drawings, the earth sleeve 20 is radially outward of the output sleeve 18. In other words, at least in some examples, the earth sleeve 20 extends around the shaft 4, the first and second nuts 10, 12 and the output sleeve 18.

Figure 2:
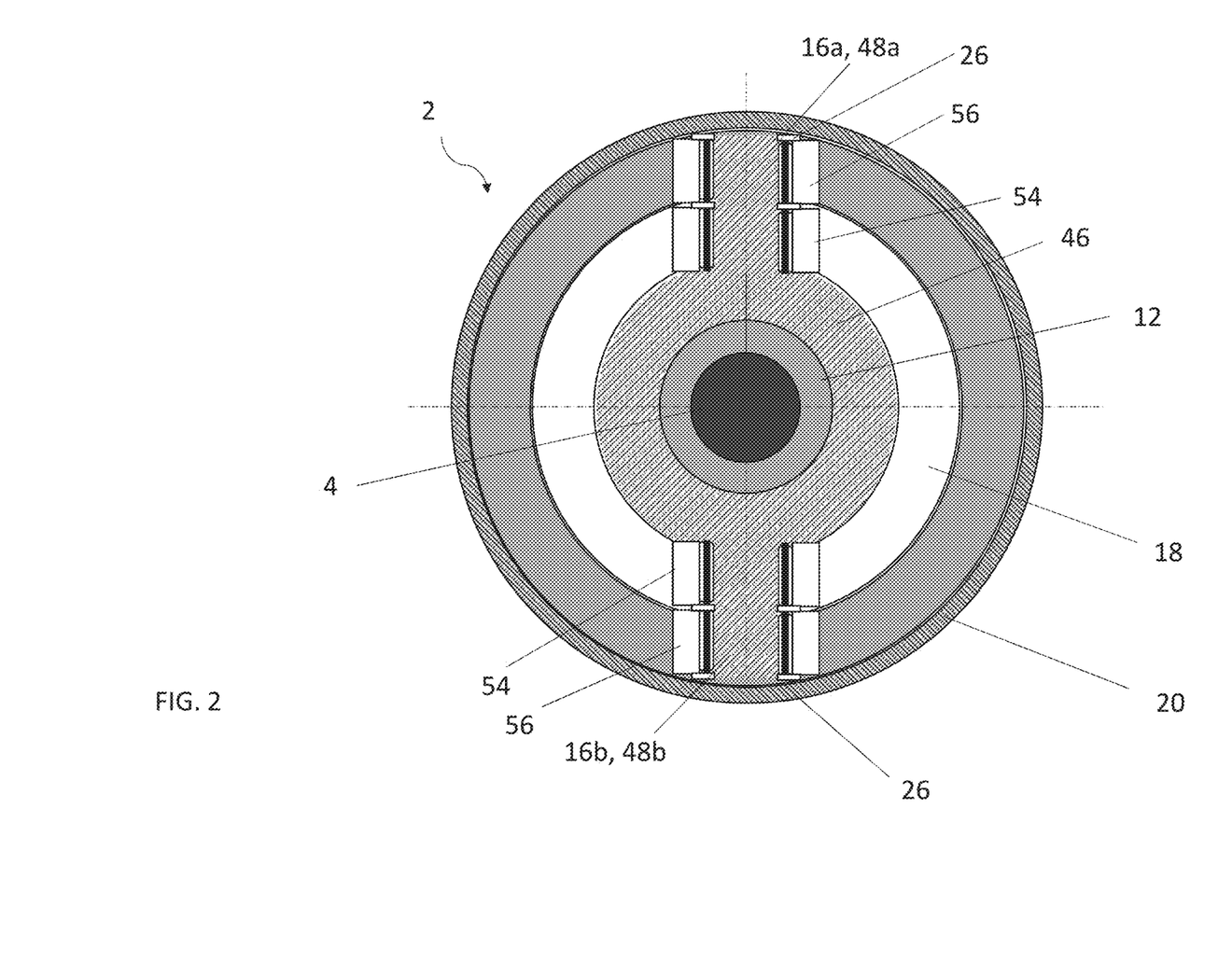
FIG. 2 is a radial cross sectional view of the actuator of FIG. 1, taken along line A-A of FIG. 1 and not taken to scale.

The output sleeve 18 includes a plurality of first guides 22 and a plurality of second guides 24 (as seen in FIG. 2 which is a radial cross section taken along line A-A of FIG. 1 and described in further detail below).

The earth sleeve 20 includes a plurality of earth guides 26. The earth guides 26 are formed in or on the earth sleeve 20 and extend axially or substantially parallel to the longitudinal axis X-X of the shaft 4. It will be understood that in an example of the disclosure, substantially parallel to may mean within + or −5° of exactly parallel to the longitudinal axis. The earth guides may function to maintain the first and second nuts 10, 12 in alignment with the earth sleeve 20 as will become apparent from the description below.

Each first component 14 of the plurality of first components 14 engages with a respective first guide of the plurality of first guides 22 and with a respective earth guide of the plurality of earth guides 26 for movement there along. Each second component of the plurality of second components 16 engages with a respective second guide of the plurality of second guides 24 and with a respective earth guide of the plurality of earth guides 26 for movement there along. The first and second threaded portions 6, 8 are threaded so as to cause the first and second nuts 10, 12 to move along the shaft 4 in opposite directions to each other on rotation of the shaft 4. It will be understood that the first and second nuts 10, 12 may be caused to move in opposite axial directions along the shaft 4. The first and second guides 22, 24 are configured such that movement of the plurality of first and second components 14, 16 along the respective first and second guides 22, 24 as the shaft 4 rotates drives rotation of the output sleeve 18. In any example of the disclosure, the rotation of the output sleeve 18 may be relative to the earth sleeve 20. In any example of the disclosure, the plurality of first guides 22 and the plurality of second guides 24 may be helical.

First and second axially spaced earth guides could be provided for receiving the respective first and second components but in other examples, only a single, continuous earth guide 26 may be provided for each corresponding set of first and second components. In such examples, the continuous earth guide may extend along the full axial extent of the plurality of first and second guides 22, 24.

Thus, each of the first and second components 14, 16 which engage with their respective first and second guides 22, 24 will also engage with one respective earth guide.

In any example of the disclosure, the rotary actuator 2 may include a driver 58 for driving rotation of the shaft 4. The driver can for example be a hydraulic driver or an electric motor (as shown in the example of FIG. 1). A rotary output 28 of the driver 26 can be connected to the shaft 4 to drive rotation thereof. In any example of the disclosure therefore, the shaft 4 can be driven to rotate at the same speed as the rotary speed of the driver output.

A connection 30 to a suitable power source (such as an electrical connection to a mains power supply or battery for example) is provided for the driver 58. In one example, the driver 58 may be a 24V or a 48V motor capable of driving rotation of the shaft 4 between 1000 and 3000 rpm.

In any example of the disclosure, the shaft 4 and the output sleeve 18 can be arranged such that the longitudinal axis (not shown) of the output sleeve 18 extends parallel to the longitudinal axis X-X of the shaft 4. In any example and as shown in FIG. 1, the shaft 4 and the output sleeve 18 can be coaxial.

The output sleeve 18 can form a housing which can be closed at a first axial end thereof 32. The housing can incorporate any suitable arrangement for driving output torque. In the example shown in FIG. 1, the arrangement for driving output torque comprises an output spline 34 at the first axial end 32. The shaft 4 can be mounted to the housing at the first axial end 32 thereof by one or more bearings 36. In the example shown, the one or more bearings 36 are provided in a recess 38 in the housing so as to extend between an outer circumferential surface of the shaft 4 and the housing.

The driver 58 can be mounted in a driver housing 40. The driver housing 40 may be provided at the opposite axial end of the output sleeve 18 from the first axial end 32 and may act to close the housing at the second axial end 42 thereof. The shaft 4 can be mounted to the rotary output 28 for rotation therewith and the rotary output 28 can be mounted to the driver housing 40 by one or more bearings 44. In the example shown, the one or more bearings 44 include two axially spaced bearings supporting the rotary output 28 within the driver housing 40.

As described above, the shaft 4 includes a first threaded portion 6 and a second, axially spaced threaded portion 8 formed on the shaft 4. In any example of the disclosure, the shaft 4 can be rotated in either a clockwise or an anti-clockwise direction. The first threaded portion 6 may have either a left handed or a right handed thread. The second threaded portion 8 has the other of a left handed or a right handed thread. In other words, the first and second threaded portions 6, 8 have opposite handed threads. Thus, when the shaft 4 is rotated in one of the clockwise or anti-clockwise directions, the first nut 10 will move axially along the first threaded portion 6 in a first direction and, at the same time, the second nut 12 will move axially along the second threaded portion 8 in a second direction, opposite to the first direction. Rotation of the shaft 4 in the other of the clockwise or anti-clockwise directions will cause the first nut 10 to move axially along the first threaded portion 6 in the second, opposite direction and, at the same time, the second nut 12 to move axially along the second threaded portion 8 in the first direction.

The first threaded portion 6 and the second threaded portion 8 on the shaft 4 may have the same pitch to provide the same speed of movement of the first and second nuts 10, 12. In at least some examples of the disclosure, the first threaded portion 6 and the second threaded portion 8 may have a diameter of about 8 to 16 mm and a fine pitch, typically of about 1 to 2 mm, to provide a relatively slow speed of movement or translation of the first and second nuts 10, 12 along the shaft 4.

It will be understood that, in any example of the disclosure, the first threaded portion 6 and the second threaded portion 8 may form respective ball screws and the first and second nuts 10, 12 may be first and second ball nuts. In an alternative, in any example of the disclosure, the first threaded portion 6 and the second threaded portion 8 may form respective roller screws and the first and second nuts 10, 12 may be first and second roller nuts. In an alternative, in any example of the disclosure, the first threaded portion 6 and the second threaded portion 8 may form respective lead screws and the first and second nuts 10, 12 may be first and second lead nuts. Further, if desired, it will be understood that a combination of any of ball screws, lead screws and roller screws together with any ball nuts, lead nuts or roller nuts required could be used for the first and second threaded portions.

As described above, a plurality of first components 14 are provided which extend radially outward from the first nut 10. A plurality of second components 16 are also provided which extend radially outward from the second nut 12. In some examples of the disclosure and as shown in the example of FIG. 2, two first components (not shown) and two second components 16a, 16b can be provided, the two first components extending in radially opposite directions to each other and the two second components 16a, 16b also extending in radially opposite directions to each other.

Figure 3:
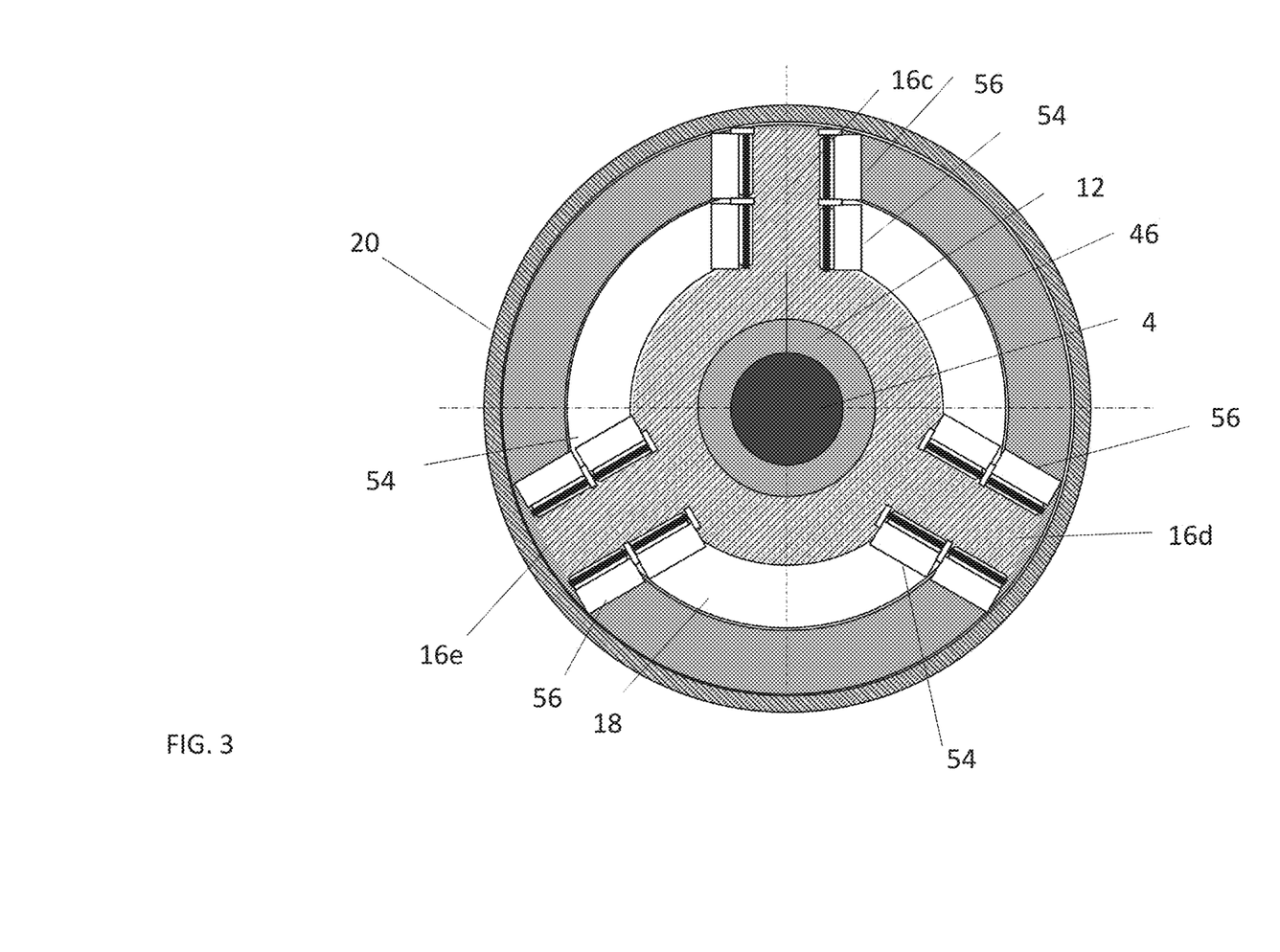
FIG. 3 is a radial cross sectional view of an actuator similar to that of FIG. 1 and not taken to scale.
Figure 4:
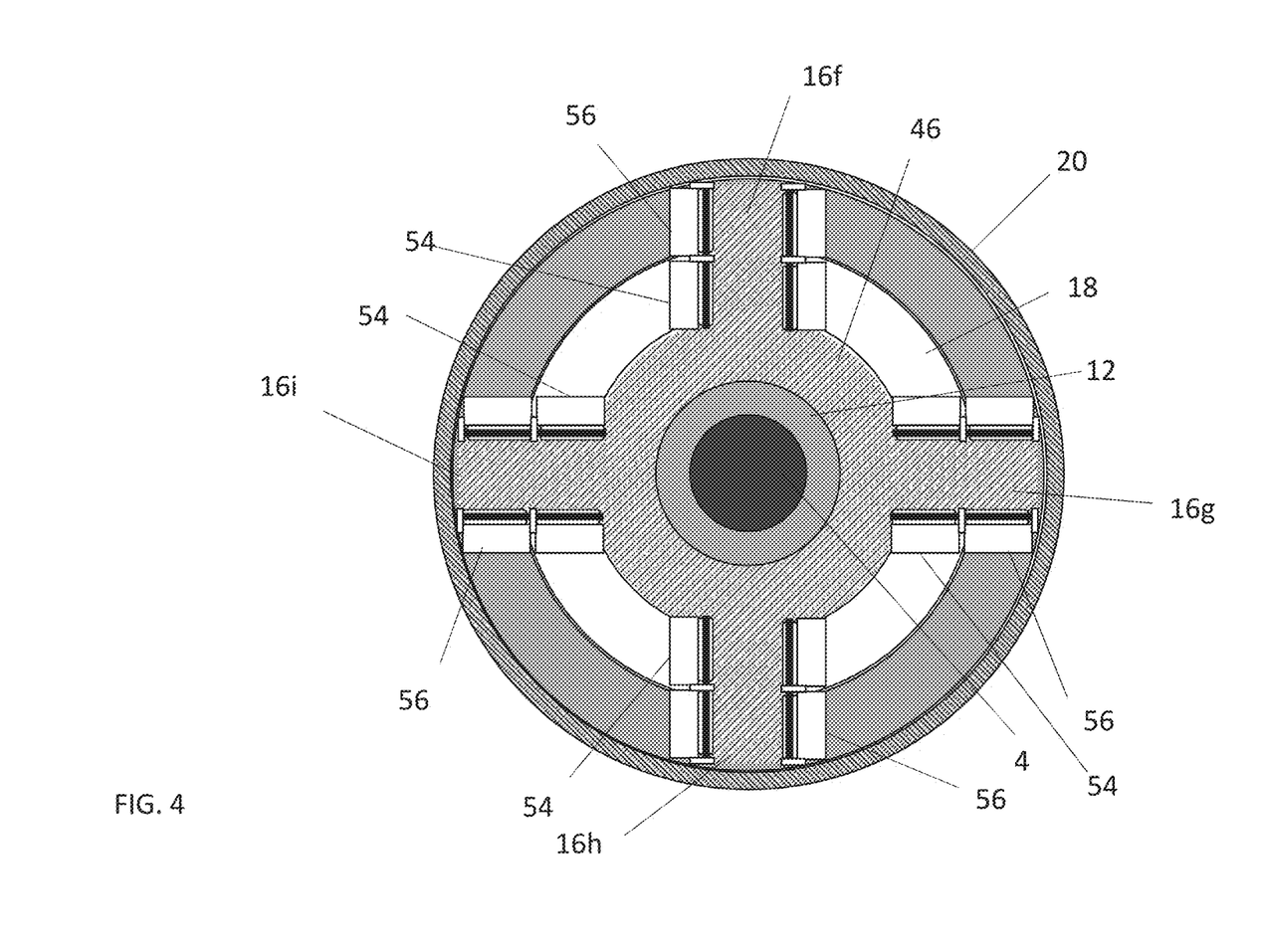
FIG. 4 is a radial cross sectional view of an actuator similar to that of FIG. 1, taken along line A-A of FIG. 1 and not taken to scale.

Other numbers and arrangements of first components and second components can also be provided, including three, four, five or six of each of the first components and second components. It will be understood that in any of these arrangements, the first components and second components can be evenly distributed around the shaft. For example therefore, where three first components (not shown) and three second components 16c, 16d, 16e are provided as in the example of FIG. 3, the angle between each of the first components and between each of the second components may be about 120°. Or, where four first components (not shown) and four second components 16f, 16g, 16h, 16i are provided as shown in FIG. 4, the angle between each of the first components and between each of the second components 16f, 16g, 16h, 16i may be about 90°.

The plurality of first and second components 14, 16 could take any suitable form, for example, being pins fixed to and extending radially outwardly from the first or second nut 10, 12. In any example however, the plurality of first and second components 14, 16 can be fixed to or formed integrally with an annular part 46 so as to extend radially outwardly therefrom. The annular part 46 can be concentric with the shaft 4 and fixed to the radially outer circumferential surface of the first or second nut 10, 12. It will be understood that, in other examples, the annular part 46 could be formed integrally with the first or second nut 10, 12. In the example shown in FIGS. 1 and 2, two first components 14 are provided on one annular part 46 and two second components 16 are provided on another annular part 46. Each of the first and second components may be a cylindrical pin 48a, 48b and can extend radially outwardly from the annular part 46 such that each pin 48a, 48b extends at 180° to its adjacent pin.

In any arrangement as described above, a respective first guide 22 for engagement with each first component 14 is provided. Further, a respective second guide 24 for engagement with each second component 16 is provided. For example therefore, where two first components and two second components are provided, two first guides 22 and two second guides 24 will be provided. At any section through the output sleeve 18, the two first guides 22 may be on opposite sides of the output sleeve 18, spaced by 180° From each other and the two second guides 24 will be on opposite sides of the output sleeve 18, spaced by 180° From each other. Similarly, where three first components and three second components are provided, three first guides and three second guides will be provided. Or, where four first components and four second components are provided as in the example shown in FIGS. 4 to 7, four first guides 22 and four second guides 24 will be provided. At any radial section through the output sleeve 18, the four first guides 22 may be spaced by about 90° From each other and the four second guides 24 may be spaced by about 90° From each other.

It will be understood that in any example, each of the first guides 22 may extend parallel or substantially parallel to each other. In a similar manner, each of the second guides 24 may extend parallel or substantially parallel to each other.

As seen in FIG. 1, the output sleeve 18 can be mounted to the earth sleeve 20 by bearings 50, 52 provided at or proximate the axial ends of the output sleeve 18 such that the output sleeve 18 can rotate relative to the earth sleeve 20. The bearings 50, 52 can for example be rolling ball bearings, needle roller bearings or bushing type bearings.

In any of the examples shown in which each of the first and second components 14, 16 is a pin (for example pins 48a, 48b of FIG. 2), each pin can include a roller and an earth roller (for example, track roller assemblies) mounted radially adjacent to each other on the pin to form a radially inner roller 54 and a radially outer earth roller 56. Each radially inner roller 54 provided on a pin of one of the first components 14 engages with a respective one of the first guides 22. Each radially inner roller 54 provided on a pin of one of the second components 16 engages with a respective one of the second guides 24. In addition, each radially outer earth roller 56 provided on a pin of one of the first components 14 engages with a respective one of the earth guides 26. Each radially outer earth roller 56 provided on a pin of one of the second components 16 engages with a respective one of the earth guides 26 (which may for example be earth tracks). This causes rotation of the output sleeve 18 as the shaft 4 rotates.

The guides 22, 24 may take various forms and in some examples, the guides could be slots formed in the sleeve which slidably receive a part of the first or second component 14, 16. In the example shown in which the first and second components 14, 16 include rollers 54, 56, the guides 22, 24 may be tracks along which the rollers 54, 56 move.

It will be understood that, in any example of the disclosure, the first and second guides 22, 24 may have equal and opposing lead angles. In any example of the disclosure, the first and second guides 22, 24 may form mechanical ramps.

Each of the guides 22 may extend helically around a part of sleeve 18 circumference.

The first guides 22 can be angled relative to the axis X-X so as to form part of a helix extending along the longitudinal extent of the actuator 2 over the extent of the first threaded portion 6. In the example shown, each first guide 22 is angled relative to the axis X-X at about 15°. The second guides 24 can be angled relative to the axis X-X so as to form part of a helix extending in an opposite direction along the longitudinal extent of the actuator 2 over the extent of the second threaded portion 8. In the example shown, each second guide 24 is angled relative to the axis X-X at about 15°. It will further be understood that first and second guides 22, 24 may mirror each other about a radially extending centreline of the actuator 2. Thus, if developed each first guide 22 would provide a fundamental helical form or thread extending around the output sleeve 18 in a first direction, whereas each second guide 24 would provide a fundamental helical form or thread extending around the output sleeve 18 in a second, opposite direction.

Figure 5:
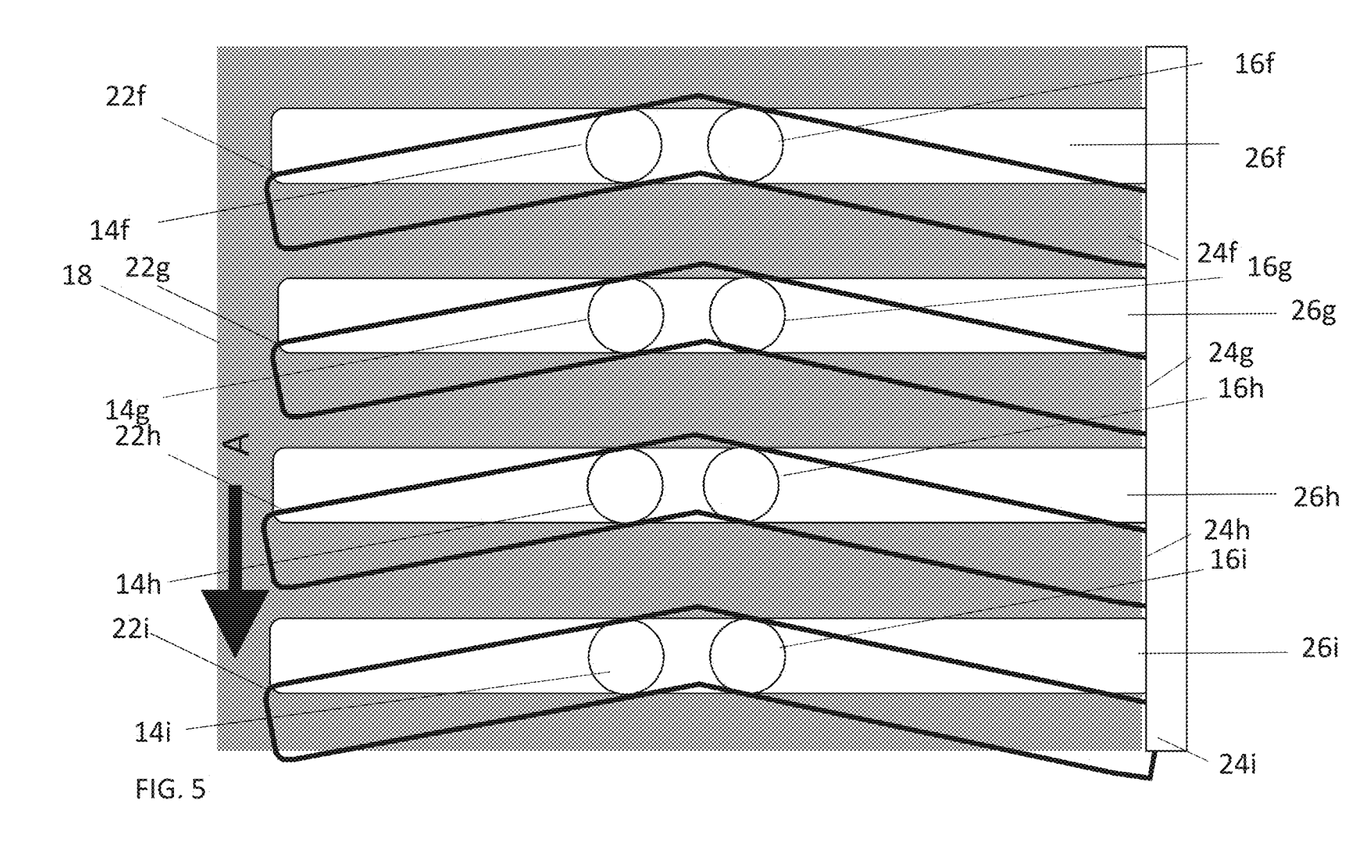
FIGS. 5 to 7 provide a schematic representation of the movement of each first and second component of an actuator according to the disclosure along respective first and second guides.

Operation of an actuator 2 such as the actuator of FIGS. 1 and 4 will now be described with reference to FIGS. 5 to 7 which are schematic projections of the output sleeve 18 showing all four of the first and second guides 22, 24 and the earth guides 26 of the actuator 2 of FIG. 4. FIG. 5 shows the first components 14 and second components 16 when the first and second nuts 10, 12 are at the position shown in FIG. 1. In other words, the first and second nuts 10, 12 are retracted so as to be at the ends of their respective threaded portions closest to each other. In this position, the actuator is at one end of its stroke.

When the driver 58 is actuated, the shaft 4 rotates, causing each first component 14*f*, 14*g*, 14*h*, 14*i* to move along its respective first guide 22*f*, 22*g*, 22*h*, 22*i* and its respective earth guide 26*f*, 26*g*, 26*h*, 26*i* and away from its respective associated second component 16*f*, 16*g*, 16*h*, 16*i*. At the same time, rotation of the shaft 4 also causes each second component 16*f*, 16*g*, 16*h*, 16*i* to move along its respective second guide 24*f*, 24*g*, 24*h*, 24*i* and its respective earth guide 26*f*, 26*g*, 26*h*, 26*i* and away from its respective associated first component 14*f*, 14*g*, 14*h*, 14*i*. As both the first guides 22*f*, 22*g*, 22*h*, 22*i* and the second guides 24*f*, 24*g*, 24*h*, 24*i* are angled such that motion of the first components 14 and second components 16 along the guides has a component in the same circumferential direction, the output sleeve 18 is caused to rotate in a first circumferential direction (as shown by the arrow A) by the movement of the first and second components 14*f*, 14*g*, 14*h*, 14*i*, 16*f*, 16*g*, 16*h*, 16*i* away from each other.

Figure 6:
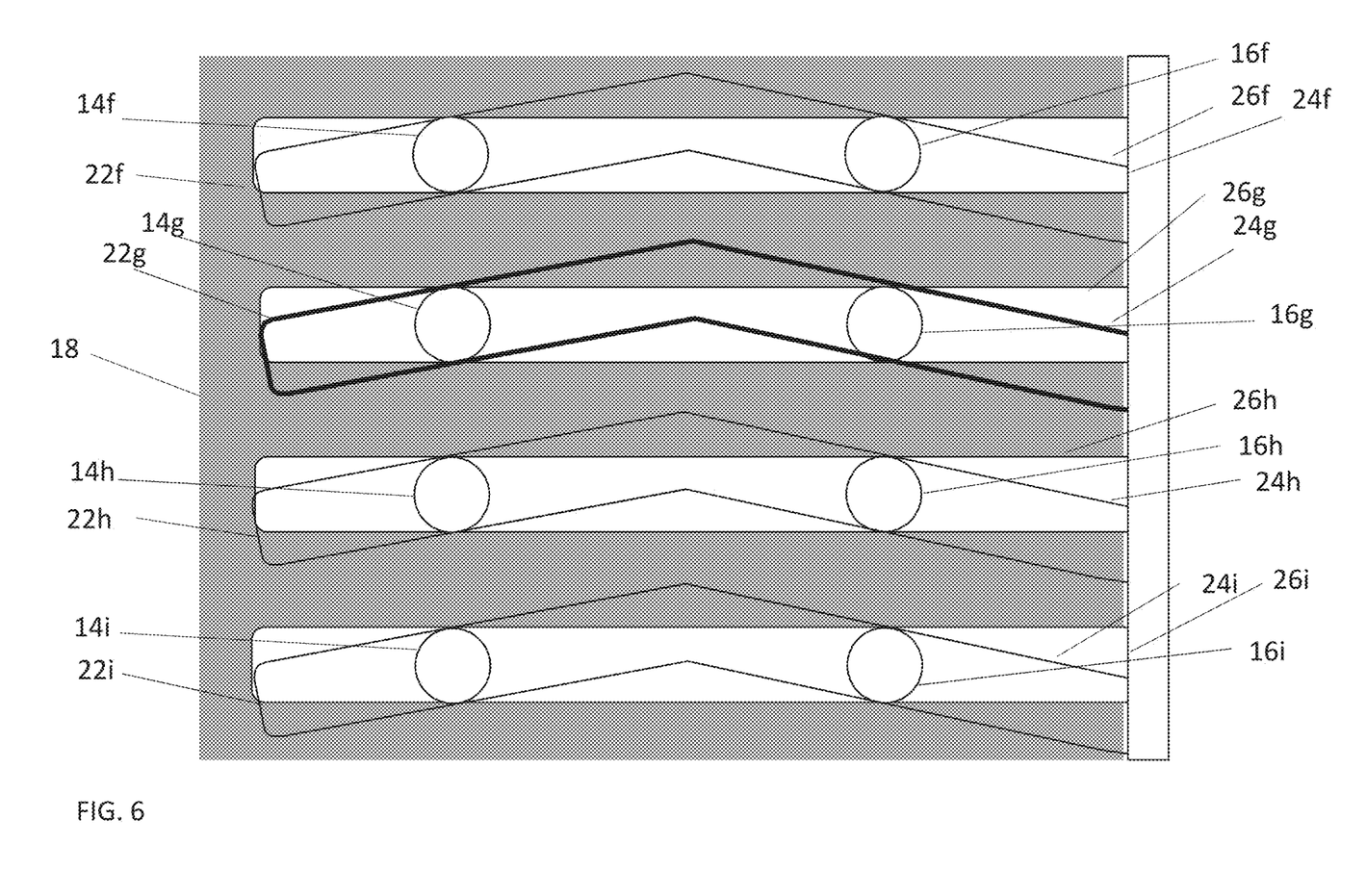

FIG. 6 shows the first components 14*f*, 14*g*, 14*h*, 14*i* and second components 16*f*, 16*g*, 16*h*, 16*i* when the first and second nuts 10, 12 are at a position approximately midway through the stroke of the actuator, in other words when the first and second nuts 10, 12 are approximately midway along their respective threaded portions 6, 8.

Figure 7:
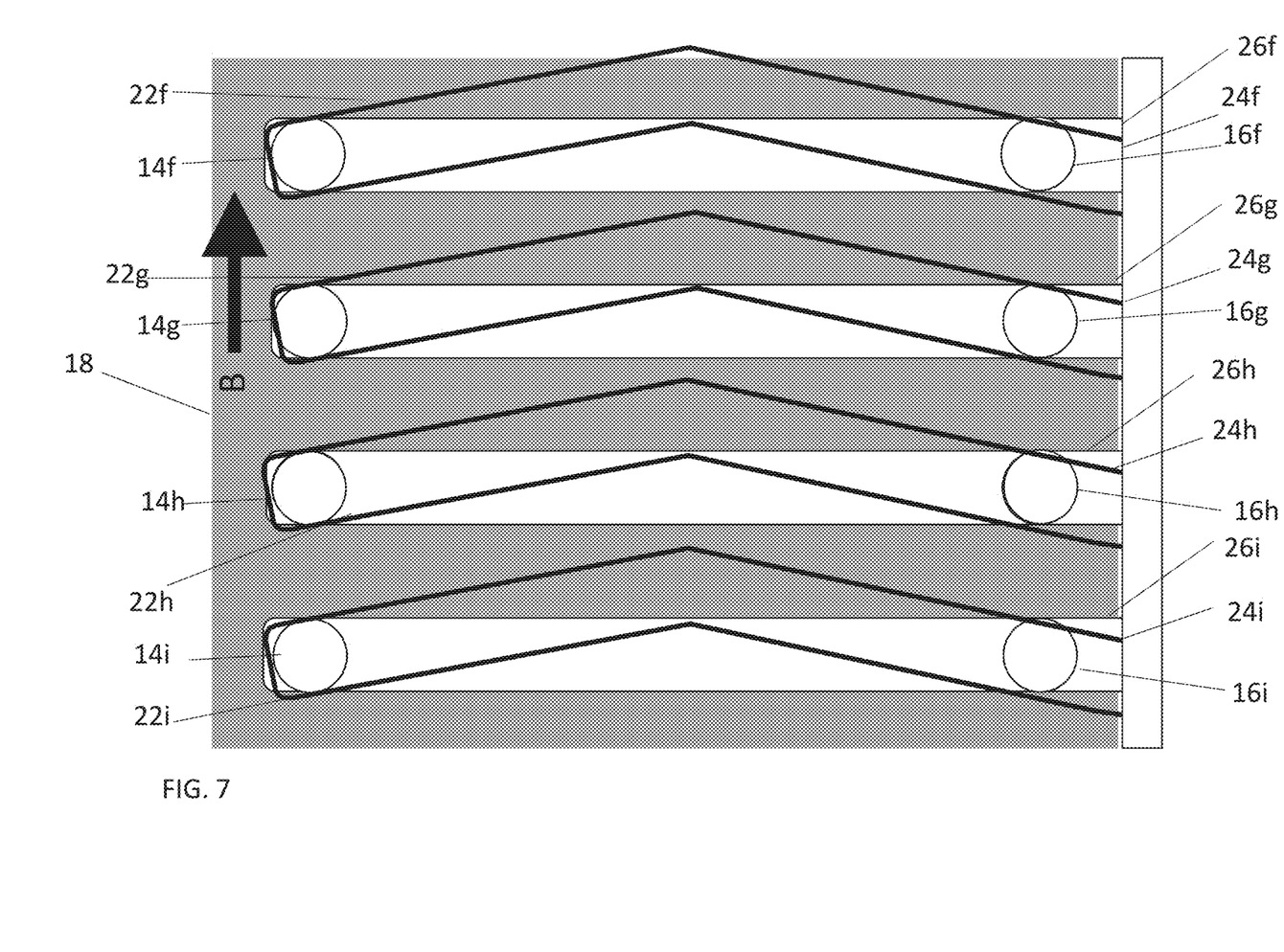

FIG. 7 shows the first components 14*f*, 14*g*, 14*h*, 14*i* and second components 16*f*, 16*g*, 16*h*, 16*i* when the first and second nuts 10, 12 have reached the end of the stroke of the actuator 2, in other words when the first and second nuts 10, 12 are approximately at the end of their respective threaded portions 6, 8 and are as far apart as they can get.

Once the end of the actuator stroke has been reached, or at any other position or stage in the actuator stroke, the driver 58 can be reversed so as to rotate the shaft 4 in the opposite direction, thus causing each first component 14*f*, 14*g*, 14*h*, 14*i* to move along its respective first guide 22*f*, 22*g*, 22*h*, 22*i* and its respective earth guide 26*f*, 26*g*, 26*h*, 26*i* and towards its respective associated second component 16*f*, 16*g*, 16*h*, 16*i*. At the same time, rotation of the shaft also causes each second component 16*f*, 16*g*, 16*h*, 16*i* to move along its respective second guide 24*f*, 24*g*, 24*h*, 24*i* and its respective earth guide 26*f*, 26*g*, 26*h*, 26*i* and towards its respective associated first component 14*f*, 14*g*, 14*h*, 14*i*. As both the first guides 22*f*, 22*g*, 22*h*, 22*i* and the second guides 24*f*, 24*g*, 24*h*, 24*i* are angled such that motion of the first components 14*f*, 14*g*, 14*h*, 14*i* and second components 16*f*, 16*g*, 16*h*, 16*i* along the guides has a component in the same circumferential direction, the output sleeve 18 is caused to rotate in a second circumferential direction which is opposite to the first circumferential direction shown by A in FIG. 5 (as shown by the arrow B in FIG. 7) by the movement of the first and second components 14, 16*f*, 16*g*, 16*h*, 16*i* towards each other.

In any example of the disclosure, the rotation of the output sleeve 18 in either circumferential direction can be used to drive the rotation of any suitable component. At least in some examples, the rotation may be output via suitable means such as the output spline 34 of the example of FIG. 1. In any example, the rotary actuator may be used in an aircraft 1, for example to move a control surface 3 of the aircraft such as, for example, a control surface provided on the aircraft wing.

In any example of the disclosure, the external diameter of the actuator 2 may be between about 60 and 70 mm, for example about 65 mm.

It will be understood that, in actuators according to the disclosure, including that of the example shown, the overall speed reduction ratio is a function of the pitch of the first and second threaded portions together with the lead angle of the guides. In any example of the disclosure, an overall mechanical advantage between the rotational speed of the driver and the rotational speed of the output sleeve of between 250:1 and 500:1 may be achieved. It will be understood that the actuator can provide output rotation in either circumferential direction. The output rotation range may be possibly between −90 and +90 degrees and typically between about −20° to +20°.

In any example of the disclosure, a bidirectional rotary actuator can be provided.

By providing the first and second components which move in opposite directions to each other to drive rotation of the actuator, the actuator according to the disclosure allows internal axial loads to be contained within the actuator or to cancel each other out. Thus, for example, the bearings 50, 52 which support the output sleeve 18 within the earth sleeve 20 may need to take very little force and so can be made smaller and lighter than would otherwise be the case.

It will further be understood that the contact stress of the first and second components 14, 16 against their respective first and second guides 22, 24 will limit the output torque which may be achieved as, if the contact stress is too high, the guides may become deformed. The number of first and second components provided will reduce this stress such that an actuator having a greater number of first and second guides 22, 24 provided on the output sleeve 18 may be capable of outputting a higher torque.

While the disclosure has been described in detail in connection with only a limited number of examples, it should be readily understood that the disclosure is not limited to such disclosed examples. Rather, the disclosure can be modified to incorporate any number of variations, alterations, substitutions or equivalent arrangements not heretofore described, but which are commensurate with the scope of disclosure. Additionally, while various examples of the disclosure have been described, it is to be understood that aspects of the disclosure may include only some of the described examples. Accordingly the disclosure is not to be seen as limited by the foregoing description, but is only limited by the scope of the appended claims.

The invention claimed is:

1. A rotary actuator comprising:
a shaft;
a first threaded portion and a second threaded portion formed on the shaft and axially spaced from each other;
a first nut mounted for movement along the first threaded portion;
a second nut mounted for movement along the second threaded portion;
a plurality of first components extending radially outward from the first nut;
a plurality of second components extending radially outward from the second nut;

an earth sleeve extending around the shaft and the first and second nuts; and an output sleeve extending around the shaft and the first and second nuts;

wherein the shaft is configured to be driven to rotate about a longitudinal axis thereof relative to the earth sleeve;

wherein the earth sleeve comprises a plurality of axially extending earth guides;

wherein the output sleeve comprises a plurality of first guides and a plurality of second guides;

wherein each first component engages with a respective first guide and a respective earth guide for movement there along;

wherein each second component engages with a respective second guide and a respective earth guide for movement there along;

wherein the first and second threaded portions are threaded so as to cause the first and second nuts to move along the shaft in opposite directions to each other on rotation of the shaft; and wherein the plurality of first guides and the plurality of second guides are configured such that movement of the plurality of first and second components along the respective guides as the shaft rotates drives rotation of the output sleeve.

2. The rotary actuator as claimed in claim 1, comprising a driver for driving rotation of the shaft.

3. The rotary actuator as claimed in claim 2, wherein the driver is an electric motor.

4. The rotary actuator as claimed in claim 1, wherein the first threaded portion is one of a left handed or right handed thread, and wherein the second threaded portion is the other of a left handed or right handed thread.

5. The rotary actuator as claimed in claim 1, wherein the plurality of first guides and the plurality of second guides are angled relative to the longitudinal axis.

6. The rotary actuator as claimed in claim 1, wherein each of the plurality of first guides are angled equally relative to the longitudinal axis, and wherein each of the plurality of second guides are angled equally relative to the longitudinal axis.

7. The rotary actuator as claimed in claim 1, wherein the angle of the plurality of first guides relative to the longitudinal axis is equal and opposite to the angle of the plurality of second guides relative to the longitudinal axis.

8. The rotary actuator as claimed in claim 1, wherein the plurality of first guides are axially spaced from the plurality of second guides.

9. The rotary actuator as claimed in claim 1, wherein there are equal number of first components, second components, first guides and second guides.

10. The rotary actuator as claimed in claim 1, wherein each first guide and each second guide comprises a track and wherein each first component and each second component includes a roller engaged with a respective track.

11. The rotary actuator as claimed in claim 1, wherein each earth guide comprises an earth track or first and second axially spaced earth tracks, and wherein each first component and each second component includes an earth roller engaged with the respective earth track or the respective first and second axially spaced earth tracks.

12. The rotary actuator as claimed in claim 1, wherein the output sleeve is rotatable relative to the earth sleeve.

13. The rotary actuator as claimed in claim 1, wherein the output sleeve is radially outward of the earth sleeve, or wherein the output sleeve is radially inward of the earth sleeve.

14. The rotary actuator as claimed in claim 1, wherein the rotary actuator is configured such that the axial forces generated by each first component moving along each first guide are approximately equal and opposite to the axial forces generated by each second component moving along each second guide.

15. An aircraft comprising:

a control surface; and a rotary actuator as claimed in claim 1;

wherein the rotary actuator is configured to move the control surface relative to the aircraft.

* * * * *